United States Patent Office 3,503,916
Patented Mar. 31, 1970

3,503,916
SOLUTIONS OF ALKALI-SOLUBLE COPOLYMERS
Henry Warson, Solihull, and George A. Reed, Thingwall, England, assignors to Dunlop Rubber Company Limited, London, England, a British company
No Drawing. Filed Aug. 8, 1966, Ser. No. 570,699
Claims priority, application Great Britain, Aug. 13, 1965, 34,677/65
Int. Cl. C08f 45/22, 15/40
U.S. Cl. 260—29.6
19 Claims

ABSTRACT OF THE DISCLOSURE

An emulsion of an alkali-soluble terpolymer comprising a vinyl ester in which the carbon atom alpha to the carboxyl group is a tertiary atom, a vinyl ester of a lower saturated carboxylic acid and a polymerizable unsaturated carboxylic acid in an amount of at least 5% by weight. Polymers prepared by emulsion polymerization at a pH of less than 7. The aqueous emulsions are rendered water-soluble by bases or organic amines, and the solutions can be used for coating and other purposes.

---

This invention relates to emulsions of alkali-soluble copolymers and to a method for their manufacture.

According to the present invention an emulsion of an alkali-soluble copolymer comprises a copolymer of at least three monomers comprising a vinyl ester in which the carbon atom alpha to the carboxyl group is a tertiary atom, a vinyl ester of a saturated carboxylic acid which acid contains up to three carbon atoms, and a polymerizable unsaturated carboxylic acid in an amount of at least 5 percent by weight of the total weight of the three monomers dispersed in an aqueous medium.

According to the invention also, a method for the manufacture of an emulsion of an alkali-soluble copolymer comprises polymerizing at a pH less than 7 at least three monomers comprising a vinyl ester in which the carbon atom alpha to the carboxyl group is a tertiary carbon atom, a vinyl ester of a saturated carboxylic acid which acid contains up to three carbon atoms and a polymerizable unsaturated carboxylic acid in an amount of at least 5 percent by weight of the total weight of the three monomers.

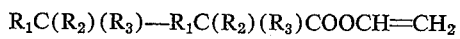

The copolymer is formed by polymerizing at least three monomers, one of which is a vinyl ester in which the carbon atom alpha to the carboxyl group is a tertiary carbon atom, i.e. the tertiary carbon atom is bonded to other carbon atoms and is not directly attached to a hydrogen atom. Typical vinyl esters can be aliphatic or aromatic and such aliphatic vinyl esters are those of the general formula, $$R_1C(R_2)(R_3) - R_1C(R_2)(R_3)COOCH=CH_2$$

in which $R_1$, $R_2$ and $R_3$ can be aliphatic hydrocarbon groups or alicyclic groups or aromatic rings. Preferably, the vinyl ester employed has the aforementioned general formula in which $R_1$ represents a $C_mH_{2m+1}$ group in which $m$ is a positive integer greater than 0, and $R_2$ and $R_3$ each are $C_nH_{2n+1}$ groups in which $n$ is a positive integer greater than 0. Preferably, vinyl esters are employed in which $m$ has a value of 4 to 8 and $n$ has a value of 1 or 2 but if the value of $n$ in $R_2$ is 1 then it should have a value of 2 in $R_3$ and vice-versa. Preferably also, mixed vinyl esters having the aforementioned formula in which $m$ has a value of 4 to 8 and $n$ has a value of 1 or 2 are employed. A typical mixed vinyl ester composition which is employed is formed from mixed fatty acids having the empirical formula $C_{9-11}H_{18-22}O_2$. An example of an aromatic vinyl ester is vinyl benzoate.

The vinyl ester in which the carbon atom alpha to the carboxylic group is a tertiary atom can be prepared by heating acetylene with the appropriate carboxylic acid in the presence of an organic liquid medium containing at least one zinc carboxylate compound whilst maintaining the concentration of the carboxylic acid in the liquid medium at or below 5% by weight. Typical carboxylic acids can be prepared by reacting a mixture of olefines with carbon monoxide and water in the presence of an acid catalyst. Formic acid may be employed instead of carbon monoxide and water. The acid catalyst can be phosphoric acid, sulphuric acid, monohydroxyfluoroboric acid, or complexes of phosphoric acid, boron trifluoride and water. Preferably, the olefines should contain at least 7 carbon atoms.

The unsaturated carboxylic acid that is employed can be mono- or di-basic carboxylic acid. For instance, the acid can be acrylic acid, methacrylic acid, crotonic acid, itaconic acid, fumaric acid and maleic acid. An example of a tribasic acid that can be used is aconitic acid. The term "unsaturated carboxylic acid" as used in this specification is to be construed to include polybasic carboxylic acids containing 2 or more carboxylic groups in which at least one free carboxyl group is present while the other or one or more other carboxyl groups can be esterified with an alcohol. Such part esterified acids will be referred to as "half-esters." The amount of the unsaturated at least 5 percent by weight of the total weight of the three monomers.

The copolymers are also prepared from a vinyl ester of a saturated carboxylic acid, said acid containing up to 3 carbon atoms and preferably the acid is acetic acid. Usually, the amount of the vinyl ester of a saturated acid forms the major proportion of the mixed monomers.

The copolymers are obtained by polymerizing the mixed monomers in the desired proportions. Usually the amount of the vinyl ester containing a tertiary carbon atom is at least 5 percent by weight of the total weight of monomers to be polymerized. Preferably, the amount of vinyl ester containing the tertiary carbon atom is at least 10 percent of the weight of the total weight of monomers to be polymerized. The amount of the unsaturated carboxylic acid depends on the degree of alkali solubility desired and on the carboxyl content of the acid, and the amount increases as the amount of the vinyl ester with the tertiary carbon atom increases.

The method of polymerization according to the present invention is carried out by an emulsion polymerization technique employing a free-radical initiator to initiate polymerization of the monomers, and preferably, the monomers to be polymerized are added in increments during the polymerization reaction. Usually, the polymerization is carried out at a pH greater than 3, for example 3.5. Emulsifying agents and other ingredients conventionally employed in aqueous emulsion polymerization systems can be used in the method of the present invention. Preferably, a colloid is employed during the polymerization process and examples of such colloids are hydroxy ethyl cellulose and a sorghum-based dextrin of a very high amylopectin content.

The aqueous emulsions of the present invention are rendered water-soluble by alkali, or bases, e.g. sodium hydroxide, ammonia and organic amines and the solutions can be used for a number of applications. For instance, the solutions can be used as temporary protective coatings, providing undercoats for various top-coats where formed from emulsions or otherwise, paper and textile coatings and can be reacted with other chemicals and resins capable of reacting with carboxyl groups. The solutions can be reacted with melamine formaldehyde condensates to form insoluble and/or cross-linked resins.

The emulsions of the present invention are more stable to changes in pH and are less liable to vary in viscosity than emulsions prepared, say, from vinyl acetate and an unsaturated carboxylic acid without the vinyl ester having the tertiary carbon atom alpha to the carbon atom of the carboxyl group. When in the form of aqueous solutions the emulsions are more stable to the presence of excess alkali.

The invention is illustrated in the following examples, in which the following abbreviations are used for convenience:

VA=Vinyl acetate
VFE=Vinyl ester of mixed fatty acids obtainable commercially under the name "Versatic Acid" and having the empirical formula $C_{9-11}H_{18-22}O_2$ and the general formula given previously in this specification
PEO=Polyethylene oxide condensate with an alcohol which is a non-ionic surfactant obtainable under the name "Texofor B1"
SDD=Sodium salt of branched chain dodecyl toluene sulphonic acid
HC=Hydroxyethyl cellulose
W=Water
CA=Crotonic acid
PP=Potassium persulphate
SD=Sorghum-based dextrin of a very high amylopectin content
AC=Acrylic acid
BM=Butyl half-ester of maleic acid Example I Three emulsions A, B and C were prepared from the following ingredients:

| | Grammes | | |
|---|---|---|---|
| | A | B | C |
| VA | 90 | 60 | 70 |
| VFE | 5 | 25 | 25 |
| PEO | 3 | 3 | 3 |
| SDD | 0.1 | 0.1 | 0.1 |
| HC | 5 | 5 | 5 |
| PP | 1.5 | 1.5 | 1.5 |
| W | 100 | 100 | 100 |
| CA | 5 | 15 | 5 |

The general method for polymerization was to add all the ingredients except the monomers to the reaction vessel and to heat the contents of the vessel to 63° C. In each case the following mixture of monomers was then added:

Grammes
VA _____ 7
VFE _____ 2
CA _____ 1

The temperature was then raised to 73° C., the vessel contents being allowed to reflux at this temperature. The following mixture of monomers was then added gradually over 3 to 5 hours.

| | Grammes | | |
|---|---|---|---|
| | A | B | C |
| VA | 73 | 43 | 53 |
| VFE | 3 | 23 | 23 |
| CA | 4 | 14 | 4 |

Finally, the remaining 10 grammes of vinyl acetate were added gradually. The mixture was then heated for 1 hour gradually raising the temperature to 90° C. to 92° C. This procedure is advantageous to ensure complete copolymerization.

All the mulsions were stable of solids content approximately 50 percent and gave clear solutions with excess ammonia, caustic alkali or by adding an amine such as morpholine. During the addition of the base it was found desirable to dilute to 20 to 25 percent solids content to prevent the solution becoming too viscous.

The alkaline solutions, on drying, give clear films, the flexibility increasing with increasing content of the vinyl ester containing the tertiary carbon atom. If the ammoniacal solutions are dried at ambient temperatures for 24 hours, the films are highly water-resistant and are only slowly attached by alkali.

Example II

An emulsion of a copolymer was prepared from the following ingredients:

Grammes, D
VA _____ 60
VFE _____ 25
PEO _____ 3
SDD _____ 0.1
SD _____ 3
PP _____ 1.0
W _____ 100
AC _____ 15

The method of polymerization was as described in Example I except that 5 percent of all monomers was added at the commencement of polymerization.

The final emulsion was not wholly soluble in ammonia but did dissolve in excess of morpholine.

Example III

The following ingredients were employed to obtain an emulsion of a copolymer:

Gammes
VA _____ 45
VFE _____ 25
PEO _____ 3
SDD _____ 0.1
HC _____ 5.0
PP _____ 1.5
W _____ 100
BM _____ 30

All the ingredients except monomers were added to the polymerization vessel and heated to 60° C. Initially, a mixture of 7 grammes of VA, 2 grammes of VFE and 1 gramme of BM were added at this temperature and polymerization continued until the temperature was 73° C. when a mixture of 28 grammes of VA, 23 grammes of VFE and 29 grammes of BA slowly added over a period of 3 to 5 hours. Finally, the remaining 10 grammes of VA were added and the polymerization completed by heating for 1 hour at 90° C. to 92° C.

The emulsion so obtained formed a solution on the addition of ammonia.

Having now described our invention, what we claim is:

1. A solution of an alkali-soluble copolymer in an alkali solvent, said copolymer comprising at least three monomers comprising a vinyl ester in which the carbon atom alpha to the carboxyl group is a tertiary atom, a vinyl ester of a saturated carboxylic acid which contains up to three carbon atoms and a polymerizable unsaturated carboxylic acid in an amount of at least 10 percent by weight of the total weight of the three monomers.

2. A solution according to claim 1 in which the vinyl ester in which the carbon atom alpha to the carboxyl group is a tertiary atom is an aliphatic vinyl ester having the general formula $R_1C(R_2)(R_3)COOCH=CH_2$ in which $R_1$, $R_2$ and $R_3$ each represent an aliphatic hydrocarbon group, an alicyclic group or an aromatic ring.

3. A solution according to claim 2 in which $R_1$ represents a group having the formula $C_mH_{2m+1}$ in which $m$ is a positive integer greater than zero and $R_2$ and $R_3$ each represent groups having the formula $C_nH_{2n+1}$ in which $n$ is a positive integer greater than zero.

4. A solution according to claim 3 in which $m$ has a value of from 4 to 8 and $n$ has a value of 1 or 2 but when $n$ in $R_2$ is 1, then $n$ has a value of 2 in $R_3$ or vice versa.

5. A solution according to claim 3 in which the vinyl ester having the aforementioned formula is a mixture of a number of vinyl esters.

6. A solution according to claim 5 in which the vinyl ester composition has the empirical formula $$C_{9-11}H_{18-22}O_2$$

7. A solution according to claim 1 in which the vinyl ester in which the carbon atom alpha to the carboxyl group is a tertiary atom is an aromatic compound.

8. A solution according to claim 7 in which the aromatic vinyl ester is vinyl benzoate.

9. A solution according to claim 1 in which the unsaturated carboxylic acid is a monocarboxylic acid.

10. A solution according to claim 1 in which the unsaturated carboxylic acid is a dicarboxylic acid.

11. A solution according to claim 9 in which the monocarboxylic acid is acrylic acid.

12. A solution according to claim 9 in which the monocarboxylic acid is crotonic acid.

13. A solution according to claim 1 in which the vinyl ester of a saturated carboxylic acid containing up to three carbon atoms is vinyl acetate.

14. A solution according to claim 1 in which the amount of the vinyl ester of a saturated carboxylic acid containing up to three carbon atoms forms a major proportion of the copolymer.

15. A solution according to claim 1 in which the amount of the vinyl ester in which the carbon atom alpha to the carboxyl group is a tertiary atom is at least 5 percent by weight of the three monomers polymerized.

16. A solution according to claim 15 in which the amount of the vinyl ester is at least 10 percent by weight of the total weight of the three monomers.

17. A solution according to claim 1 in which the alkali is sodium hydroxide.

18. A solution according to claim 1 in which the alkali is ammonia.

19. A solution according to claim 1 in which the alkali is an organic amine.

References Cited

UNITED STATES PATENTS 2,807,865  10/1957  Shippee et al.
3,294,727  12/1966  Grommers et al.

SAMUEL H. BLECH, Primary Examiner

U.S. Cl. X.R.

117—155; 260—17.4, 29.4, 80.8, 80.81